(12) United States Patent
Pitt

(10) Patent No.: US 11,528,839 B2
(45) Date of Patent: Dec. 20, 2022

(54) COMBINE COVER CROP PLANTER

(71) Applicant: Max and Cindy Pitt, LLC, Lamoni, IA (US)

(72) Inventor: Max Pitt, Lamoni, IA (US)

(73) Assignee: MAX AND CINDY PITT, LLC, Lamoni, IA (US)

(*) Notice: Subject to any disclaimer, the term of this patent is extended or adjusted under 35 U.S.C. 154(b) by 320 days.

(21) Appl. No.: 16/414,423

(22) Filed: May 16, 2019

(65) Prior Publication Data

US 2019/0350124 A1 Nov. 21, 2019

Related U.S. Application Data

(60) Provisional application No. 62/672,842, filed on May 17, 2018.

(51) Int. Cl.
*A01C 7/00* (2006.01)
*A01C 7/20* (2006.01)
(Continued)

(52) U.S. Cl.
CPC .............. *A01C 7/006* (2013.01); *A01C 7/166* (2013.01); *A01C 7/201* (2013.01); *A01C 7/208* (2013.01); *A01C 14/00* (2013.01); *A01D 43/14* (2013.01)

(58) Field of Classification Search
CPC ......... A01C 5/062; A01C 5/064; A01C 7/006; A01C 7/08; A01C 7/201; A01C 7/203; A01C 7/208; A01D 32/14
See application file for complete search history.

(56) References Cited

U.S. PATENT DOCUMENTS 4,078,626 A * 3/1978 Weichel ................. A01D 67/00
 111/131
4,333,534 A * 6/1982 Swanson ................. A01C 5/06
 111/135
(Continued)

FOREIGN PATENT DOCUMENTS

CN 201252735 6/2009
CN 201839624 U 5/2011
(Continued)

OTHER PUBLICATIONS

Chen, "Design and Test on Sowing Device of the Multi-functional Machine for Rice-Wheat Cyclic Planting", Advance Journal of Food and Technology 7(6), pp. 428-434, Feb. 25, 2015.

*Primary Examiner* — Thomas B Will
*Assistant Examiner* — Ian A Normile
(74) *Attorney, Agent, or Firm* — Goodhue, Coleman & Owens, P.C.

(57) ABSTRACT

A planting system for a combine in embodiments of the present invention may have one or more of the following elements: (a) a soil opening system having one or more soil openers operably connected to one or more mounting arms operably attached to the combine, (b) a seed handling system having one or more seed dispensers with one or more seed tubes operably connected to the one or more seed dispensers and a seed reservoir adapted for housing cover crop seed, and (c) a control system having one or more actuators operably connected to one or more controllers, wherein at least one of the sets of soil openers and sets of seed dispensers is operably attached to a header of the combine.

11 Claims, 8 Drawing Sheets

(51) Int. Cl.
*A01D 43/14* (2006.01)
*A01C 7/16* (2006.01)
*A01C 14/00* (2006.01)

(56) References Cited

U.S. PATENT DOCUMENTS

| | | | | |
|---|---|---|---|---|
| 4,525,988 | A * | 7/1985 | Harlan | A01D 41/12 |
| | | | | 111/924 |
| 5,535,688 | A * | 7/1996 | Kaufman | A01B 73/067 |
| | | | | 111/52 |
| 7,159,523 | B2 * | 1/2007 | Bourgault | A01C 7/06 |
| | | | | 111/187 |
| 2009/0078178 | A1 * | 3/2009 | Beaujot | A01C 21/005 |
| | | | | 111/170 |
| 2009/0242220 | A1 * | 10/2009 | Cey | A01C 5/064 |
| | | | | 172/734 |
| 2016/0212931 | A1 | 7/2016 | Henry et al. | |
| 2019/0313568 | A1 * | 10/2019 | Anderson | A01B 73/065 |
| 2021/0037691 | A1 * | 2/2021 | Horsch | G05D 1/0223 |

FOREIGN PATENT DOCUMENTS

| | | | |
|---|---|---|---|
| CN | 103392418 A | 11/2013 | |
| CN | 103782715 A | 5/2014 | |
| CN | 203575046 U | 5/2014 | |
| CN | 203775698 U | 8/2014 | |
| CN | 105379504 A | 3/2016 | |
| CN | 105794392 A | 7/2016 | |
| CN | 205491780 U | 8/2016 | |
| CN | 103384467 B | 11/2017 | |
| CN | 107455047 A | 12/2017 | |
| DE | 3644767 A1 * | 7/1988 | A01D 43/14 |
| DE | 4133551 A1 | 4/1993 | |
| EP | 0640276 A1 * | 3/1995 | A01D 43/12 |
| EP | 0640276 A1 | 3/1995 | |
| EP | 3199008 A1 * | 8/2017 | A01D 41/1243 |
| RU | 2491810 C1 | 9/2013 | |

* cited by examiner

COMBINE COVER CROP PLANTER

PRIORITY STATEMENT

This application claims priority to United States Provisional Patent Application No. 62/672,842, titled Planting Mechanism for Cover Crops While Harvesting Cash Crops filed on May 17, 2018 all of which is hereby incorporated by reference in its entirety.

FIELD OF THE INVENTION

The present invention relates generally to a device, system and methods for planting crops. Particularly, the present invention relates to a device, system and methods to combine harvesting and planting to optimize the time a combine spends in the field. More particularly, the present invention relates to a device, system and methods for planting a cover crop during harvesting.

BACKGROUND

The use of cover crops has contributed to the overall success of conservation systems for many producers. Cover crops are increasingly being used to protect the soil from erosion during winter months, to enhance filtration and storage of winter rainfall, and reduce the negative effects of soil compaction. Cover crops also increase the buildup of organic matter in the soil which leads to improved soil structure. There are four classes of cover crops: grasses (such as ryegrass or broadleaves (such as spinach or flax).

Such cover crops are planted between cash crop (such as corn, soybean, wheat, rye, barley, oats, etc.) seasons to provide a living cover on the landscape, such as a field. Cover crops protect soil and water quality, reduce chemical input costs, improve farm resiliency, boost yields, increase forage availability, and improve wildlife habitat. Further advantages include improved water absorption, reduced runoff, reduced nutrient loss, and reduced chemical input costs.

Despite the benefits discussed above, planting cover crops can be time consuming and labor intensive. The additional labor, fuel, and seed expense result in most commercial producers not planting cover crops. Moreover, because harvest occurs late in the year, difficulties arise due to the time of year the cover crop must or can be planted. After the harvest of an area is complete, a farmer may make another pass through the area to plant the cover crop. Weather and field conditions can create significant challenges for getting into a field for harvest, let alone for planting cover crops. While some of these issues can be alleviated by aerially planting via a helicopter or plane, the cost significantly increases with these methods of planting. Pilots are expensive as well as the fuel for their aircraft. Further, the wind conditions must be tolerable to not blow the seed away from the field. Finally, a good amount of seed must be used as not all the seed will be absorbed by the ground and result in cover crop germination and growth.

Additionally, the Environmental Protection Agency ("EPA"), other regulatory bodies and interested stakeholders are concerned about the introduction of crop-applied nutrients into major water sources causing ecological impacts. Nutrient reduction practices can include nitrogen and phosphorus management, erosion control and land use, and edge-of-field. Management practices involve such things as application rate, timing, and method, plus the use of cover crops and living mulches. Due to many of the current challenges and barriers identified herein, farmers, for the most part, do not, or cannot affordably and therefore do not sufficiently use current methods, practices and technologies, which effectively use cover crops as a management practice for nutrient reduction into water sources used for drinking water.

Accordingly, devices and methods are needed to address the above drawbacks and deficiencies in current practices.

SUMMARY

Therefore, it is a primary object, feature, or advantage of the present invention to improve over the state of the art.

A planting system for a combine in embodiments of the present invention may have one or more of the following elements: (a) a soil opening system having one or more soil openers operably connected to one or more mounting arms operably attached to the combine, (b) a seed handling system having one or more seed dispensers with one or more seed tubes operably connected to the one or more seed dispensers and a seed reservoir adapted for housing cover crop seed, (c) a control system having one or more actuators operably connected to one or more controllers, wherein the one or more actuators are operably attached to the soil opening system and seed handling system, wherein at least one of the sets of soil openers and sets of seed dispensers is operably attached to a header of the combine, (d) a first set of the one or more soil openers operably attached to the header and a second set of the one or more soil openers operably attached behind the header to the combine, (e) a pivot assembly operably attached to the one or more soil openers and the one or more mounting arms, wherein the one or more soil openers pivot relative to the one or more mounting arms, (f) a planting position for the one or more soil openers corresponding to a harvesting position of the header of the combine, (g) a non-planting position of the one or more soil openers corresponding to a non-harvesting position of the header, and (h) a docking port with at least one hydraulic port and wiring port for operably connecting to a hydraulic output port and wiring output port of the combine.

A cover crop planting module for a combine in embodiments of the present invention may have one or more of the following features: (a) a modular tool frame with one or more mechanical connectors, electronic connectors, pneumatic connectors and hydraulic connectors configured for operable attachment to native mechanical, electronic, pneumatic, and hydraulic connectors of the combine, (b) one or more soil openers operably connected to one or more mounting arms operably attached to the modular tool frame, (c) one or more seed dispensers with one or more seed tubes operably connected to the one or more seed dispensers operably attached to the modular tool frame, (d) one or more actuators operably attached to the modular tool frame, wherein the one or more actuators are operably attached to the one or more soil openers and the one or more seed dispensers, wherein the modular tool frame is operably attached to a header of the combine with the one or more mechanical connectors of the modular tool frame operably attached to one or more mechanical connectors of the header, wherein the one or more seed dispensers are operably configured to communicate cover crop seed to the one or more soil openers during a combine operation of the combine, (e) a seed reservoir adapted for housing cover crop seed, the seed reservoir operably attached to the combine and having one or more seed tubes operably attachable to the one or more seed tubes of the cover crop planting module, and (f) one or more controllers for controlling actuation of the one or more actuators aboard the modular tool frame, wherein the one or more controllers are operably connectable to the native electronic connectors of the combine.

A combine for simultaneous harvesting grown crop and planting cover crop in embodiments of the present invention may have one or more of the following: (a) a cab housing one or more controls, a motor, and a combine frame having a wheel supported rear axle and wheel supported front axle driven by the motor and controlled from the cab with the one or more controls, (b) a header removably attachable to the combine frame and operable from the cab, (c) one or more sets of soil openers, at least one first set of soil openers operably attached to the header, (e) one or more sets of seed dispensers operably configured for planting cover crop, at least one first set of seed dispensers operably attached to the header, (f) a planting position for the first set of soil openers on the header, wherein the planting position corresponding with a harvesting position of the header, (g) a second set of soil openers and second set of seed dispensers operably attached on an underside of the combine frame between the front and rear axle, (h) a second set of soil openers and second set of seed dispensers operably attached on an underside of the combine frame behind the rear axle, (i) a seed reservoir operably attached to the combine for housing cover crop seed for planting while harvesting, and (j) one or more actuators operably attached to at least one of the sets of soil openers for actuating the at least one set of soil openers between a transport position and a planting position.

One or more of these and/or other objects, features, or advantages of the present invention will become apparent from the specification and claims follow. No single embodiment need provide every object, feature, or advantage. Different embodiments may have different objects, features, or advantages. Therefore, the present invention is not to be limited to or by any objects, features, or advantages stated herein.

BRIEF DESCRIPTION OF THE DRAWINGS

Illustrated embodiments of the disclosure are described in detail below with reference to the attached drawing figures, which are incorporated by reference herein.

Figure 1:
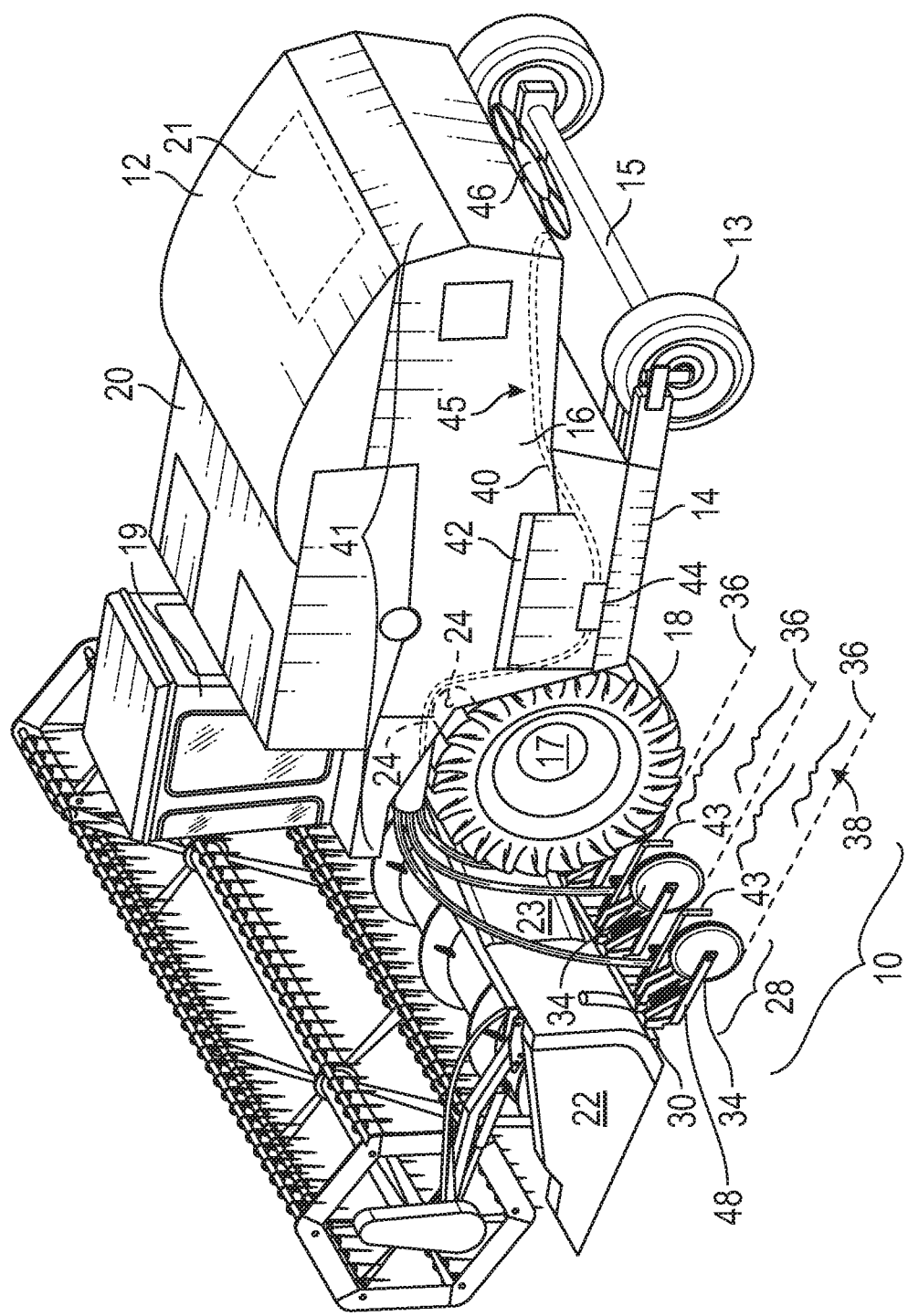
FIG. 1 is a side plan view of a combine with a seed planting system in accordance with an embodiment of the present invention.

Some of the figures include graphical and ornamental elements. It is to be understood the illustrative embodiments contemplate permutations and combinations of the various graphical elements set forth in the figures thereof.

DETAILED DESCRIPTION

The following discussion is presented to enable a person skilled in the art to make and use the present teachings. Various modifications to the illustrated embodiments will be clear to those skilled in the art, and the generic principles herein may be applied to other embodiments and applications without departing from the present teachings. Thus, the present teachings are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the present invention are discussed in terms of a combine harvester and cover crop planter system, it is fully contemplated embodiments of the present invention could be used in most any agricultural application without departing from the spirit of the invention.

The present invention provides advantages in addition to saving time and resources. Namely, planting a cover crop while harvesting is advantageous. A farmer can save time, fuel and money by planting seed at the same time a cash crop is being harvested from a field. Further, the seeding of a cover crop provides all the advantages listed above.

Disclosed is an apparatus, system and methods, for planting a cover crop, which is attached to harvesting equipment, such as a combine. Accordingly, cover crop is planted at the same time a cash crop is harvested. Preferably, but not exclusively limited to, a planting mechanism is located directly behind a combine header to maximize the benefits of the invention.

Provided is a planting apparatus with a harvesting assembly and a planting assembly, wherein the harvesting assembly harvests a first crop and the planting assembly plants a second crop simultaneously with, concurrent with or during a harvest. The planting assembly may include a seed drill or a soil opener, or in some instance a broadcast spreader. Moreover, the harvesting assembly may be a combine including a header. The planting assembly may include brackets connecting the planting assembly to the header. Further, in some embodiments, the planting assembly may include one or a plurality of structures designed to create an opening, such as a groove, in soil to receive a seed. The apparatus may further include a seed reservoir and, in some embodiments, a delivery assembly to deliver seed from the seed reservoir. The delivery assembly may include air pressure to deliver seed or mechanical elements, such as a flighted auger.

Provided is a planting apparatus for planting cover crop seed in soil with a combine having a header and a planting assembly located directly behind the header. The planting assembly may include at least one structure to create an opening, such as a groove, in the soil, a seed drill to deliver cover crop seed, a seed reservoir, and a seed delivery system to deliver seed from the seed reservoir to the seed drill, thereby planting the cover crop seed.

The following is a detailed description of a planting mechanism or apparatus of the present invention (sometimes simply "apparatus"). The apparatus of the present invention provides many advantages over the prior art. As is known in the art, cover crops may be used to protect and enhance the soil during the off-season of the cash crop and preserve and provide nutrients during the growing season. A cash crop or profit crop is an agricultural crop which is grown to sell for profit. A cover crop is planted to manage soil erosion, soil fertility, soil quality, water, water and nutrient runoff, weeds, pests, diseases, nutrient content in water and waterways, biodiversity and wildlife in an agroecosystem—an ecological system managed and shaped by humans.

In some examples, corn or soybeans could be the cash crop. Moreover, a person could use cover crops in the period between corn or soybean harvest and the following season's planting. The present invention provides a planting mechanism which takes advantage of harvesting equipment harvesting the cash crop to plant cover crop. Moreover, the planting may occur at the same time as harvest. Accordingly, the farmer will not need to enter the same field and pass over the same ground twice in order to both harvest cash crop and plant cover crop, thereby saving time and other resources, while making the most out of the available time to be working in the field. Referring to FIG. 1, an apparatus of the present invention is provided. The apparatus may be a seed planting system 10. The planting system 10 may be coupled to a combine 12. The modern combine harvester, or simply combine, is a versatile machine designed to efficiently harvest a variety of grain crops. The name derives from its combining three separate harvesting operations—reaping, threshing, and winnowing—into a single process. Among the cash crops harvested with a combine are wheat, oats, rye, barley, corn, sorghum, soybeans, flax (linseed), sunflowers and canola. The separated straw, left lying on the field, comprises the stems and any remaining leaves of the crop with nutrients left in it. The straw is then either chopped, spread on the field and ploughed back in or baled for bedding and feed for livestock.

The combine 12 includes a header 22. Combines can be equipped with removable heads designed for different crops. The standard header 22, sometimes called a corn header, grain platform or draper head, is equipped with a reciprocating knife cutter bar and features a revolving reel with metal or plastic teeth to cause the cut crop to fall into an auger once it is cut or in other instances a conveyor belt. A variation of the platform, a "flex" platform, is similar but has a cutter bar flexing over contours and ridges to cut soybeans having pods close to the ground. A flex head can cut soybeans as well as cereal crops, while a rigid platform is generally used only in cereal grains. Some wheat headers use a fabric or rubber apron instead of a cross auger. Draper headers allow faster feeding than cross augers, leading to higher throughputs due to lower power requirements. On many farms, platform headers are used to cut wheat, instead of separate wheat headers, to reduce overall costs. Dummy heads or pick-up headers feature spring-tined pickups, usually attached to a heavy rubber belt. They are used for crops having already been cut and placed in windrows or swaths. This is particularly useful in northern climates such as western Canada, where swathing kills weeds resulting in a faster dry down.

A specialized corn head or header is ordinarily used to harvest corn. The corn head is equipped with rollers striping the stalk and leaf away from the ear, so only the ear (and husk) enter the throat. This improves efficiency dramatically, since so much less material must go through the cylinder. The corn head can be recognized by the presence of points between each row. Occasionally row crop heads are seen functioning like a grain platform but have points between rows like a coin head. These are used to reduce the amount of weed seed picked up when harvesting small grains. Combines can be fitted with special tracks instead of tires to assist in harvesting.

The header 22 harvests a first crop (e.g., a cash crop), while the planting system 10 plants a second crop (e.g., a cover crop). The combine 12 may include a body 16, a combine frame 14, a motor 21, rear axle 15, front axle 17 and a grain storage tank 20. The combine frame 14 may be supported by front wheels 18 and rear wheels 13. Moreover, the combine 12 may include an operator's station or cab 19 mounted forward of the body 16. The combine 12 may include a header 22 and feeder housing 23. The feeder housing 23 may be pivotally supported by pivot brackets 24. A pair of mounting arms 26 extend between the combine frame 14 and feeder housing 23, which may be operable to raise and lower the header 22 from the cab 19.

The combine 12 can include a soil opening system or module 28. The soil opening system 28 may be any type known in the art presently or in the future. In some embodiments, a seed drill or planter may be used. In an embodiment disclosed in FIG. 1, the soil opening system 28 is connected to the feeder housing 23 and/or header 22. This allows the soil opening system 28 to "ride" or be moved in elevation simultaneously with header 22. Thus, when an operator moved the header 22 into a downward position to harvest a cash crop, the soil opening system 28 is also moved towards the soil 38 in which to engage soil 38 and begin making grooves 36, such as a soft opening in the ground, in which to plant the cover crop within.

Figure 8:
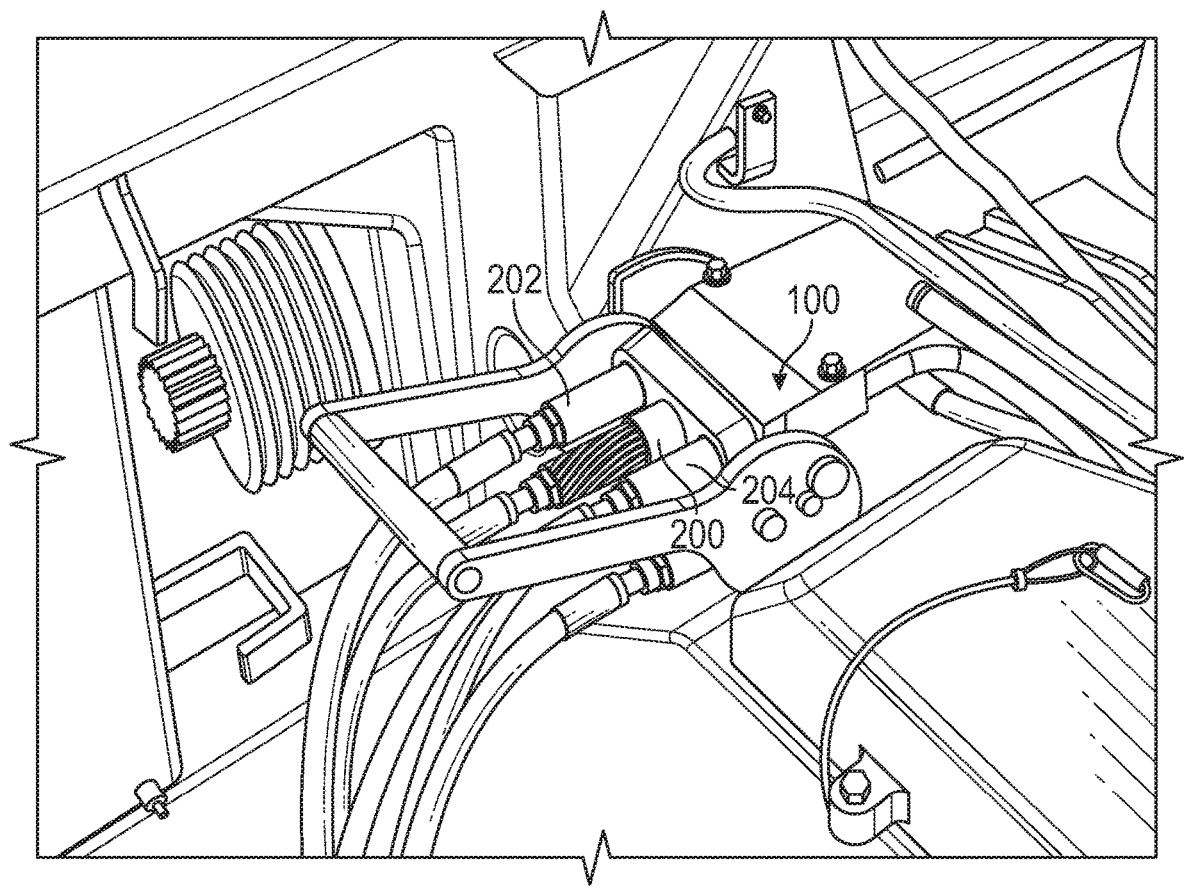
FIG. 8 is a pictorial view of connectors of a header or combine in accordance with an embodiment of the present invention.

More specifically, the soil opening system 28 includes a tool frame 30 and mechanical connectors or brackets 32 (FIG. 2) which connect the soil opening system 28 to the feeder housing 23 and header 22. Furthermore, the tool frame 30 can include several connectors 61, such as electronic connectors 60, pneumatic connectors 62 and hydraulic connectors 64 (FIG. 3B) configured for attachment through docking port 100 of combine 12, such as electronic port 200, pneumatic port 202 and hydraulic port 204 on the header 22 or combine 12 (FIG. 8).

Furthermore, the tool frame 30 can include several actuators 66 (FIG. 3A), which can be utilized to raise and lower the tool frame 30. This can occur from a controller in the cab 19 and is discussed in more detail below.

A groove 36 in the soil is created by soil openers 34 where the groove 36 receives the cover seed. For example, in FIG. 1 at least one soil opener 34 extends downward from the tool frame 30 to create the groove 36. Soil opening system 28 can include a plurality of soil openers 34 forming a groove 36 in the surface of the soil 38.

Positioned near the soil openers 34 is a seed handling system 41 having delivery tubes 40 capable of delivering seed to be planted from a seed reservoir 42. The seed reservoir 42 may include a delivery assembly 44 to assist in delivering the seed to be planted to the delivery tubes 40 and then to the seed dispensers 43. The soil opening system 28 may be raised and/or lowered with the header 22 by the mounting arms 26 (FIG. 2) which can be operated by a user in the cab 19.

As discussed above, the combine 12, including the soil opening system 28, need only pass over the same soil once to effectively harvest a cash crop and seed handling system 41 can plant a cover crop. Accordingly, as the combine 12 moves forward across a field and harvests the cash crop, such as corn or soybeans, the soil opening system 28 opens groove 36 in soil 38 and seed handling system 41 plants the cover crop seed. More specifically, as harvesting occurs, the soil opening system 28 creates a groove 36 in the soil's surface 38. The delivery assembly 44 transports seeds through the delivery tubes 40. The seeds are then dropped into groove 36 and are thereby planted. In some embodiments, air pressure could assist in transporting the seeds from the seed reservoir 42 to the soil opening system 28. Additionally, one or more closing wheels (not shown) may be operably mounted behind of each soil opener 34 to close the soil back on the planted seed.

Figure 6:
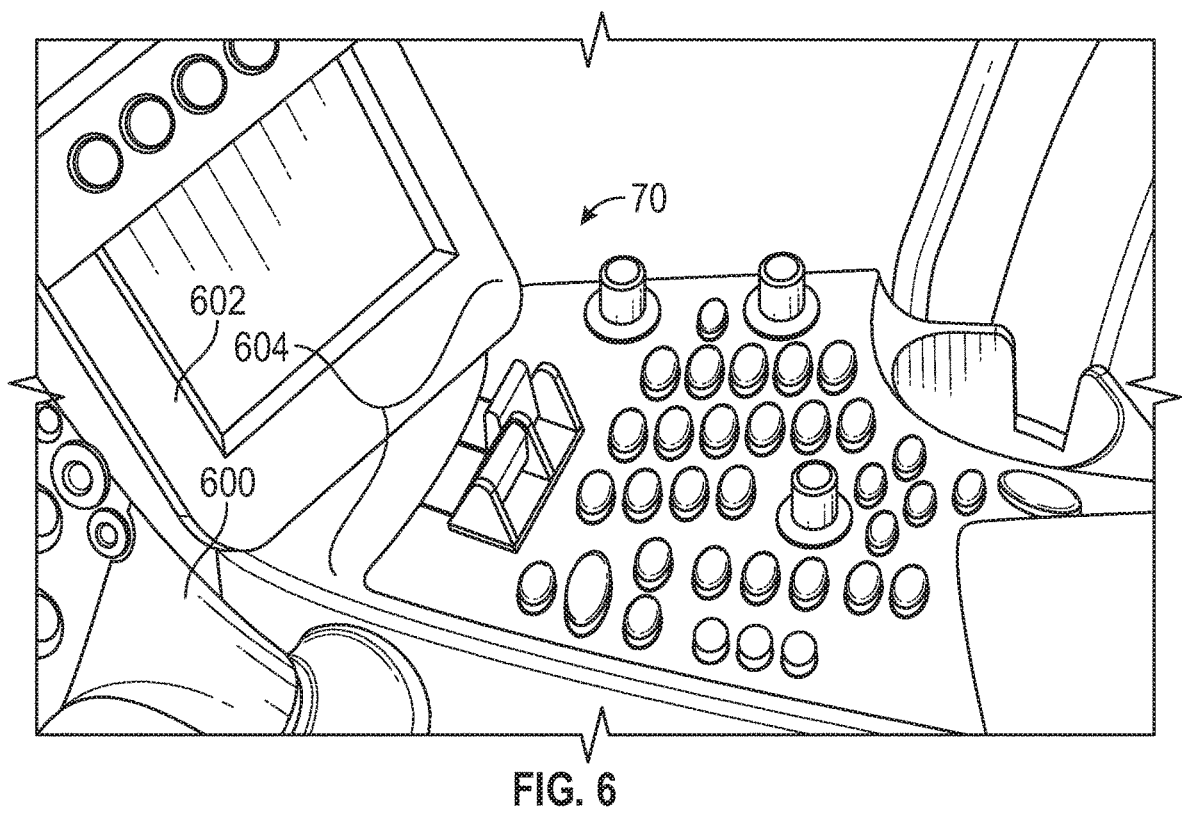
FIG. 6 is a pictorial view of a control panel for a combine in accordance with embodiments of the present invention.

The combine 12 typically includes a spreader 46. The spreader 46 may be operatively connected to the seed reservoir 42 to deliver and spread seed to be planted on the soil by broadcasting seed with spreader 46. This application can be used where soil 38 is wet or muddy and the soil openers 34 can become clogged or caked with mud. In environments like this, planting can be effective by spreading the cover seed through the spreader 46 as the cover seed is quickly pulled into the muddy soil. In instances where utilizing the spreader 46 would be more effective than using the soil opening system 28, the operator in cab 19 could initiate the cover seed being sent to spreader 46 by a switch on control panel 604 (FIG. 6). The seed handling system 41 would then stop sending cover seed to seed dispensers 43 and may transport seed from the seed reservoir 42 through rear delivery tubes 45 to the spreader 46 where seed is spread on to the surface of the soil immediately behind the combine 12 where the soil is the most exposed and free from any remaining cash crop pieces, such as stalks. When an operator decides to stop planting via soil opening system 28, the operator could also raise soil opening system up from contacting the ground through a switch on control panel 604 (FIG. 6), which powers actuators 66 (FIG. 3A) to lift tool frame 30 (FIG. 3B), which pulls soil openers 34 off of soil 38. In yet another aspect, cover crop seed could be planted using both the soil opening system 28 and broadcasting seed with spreader 46.

Figure 2:
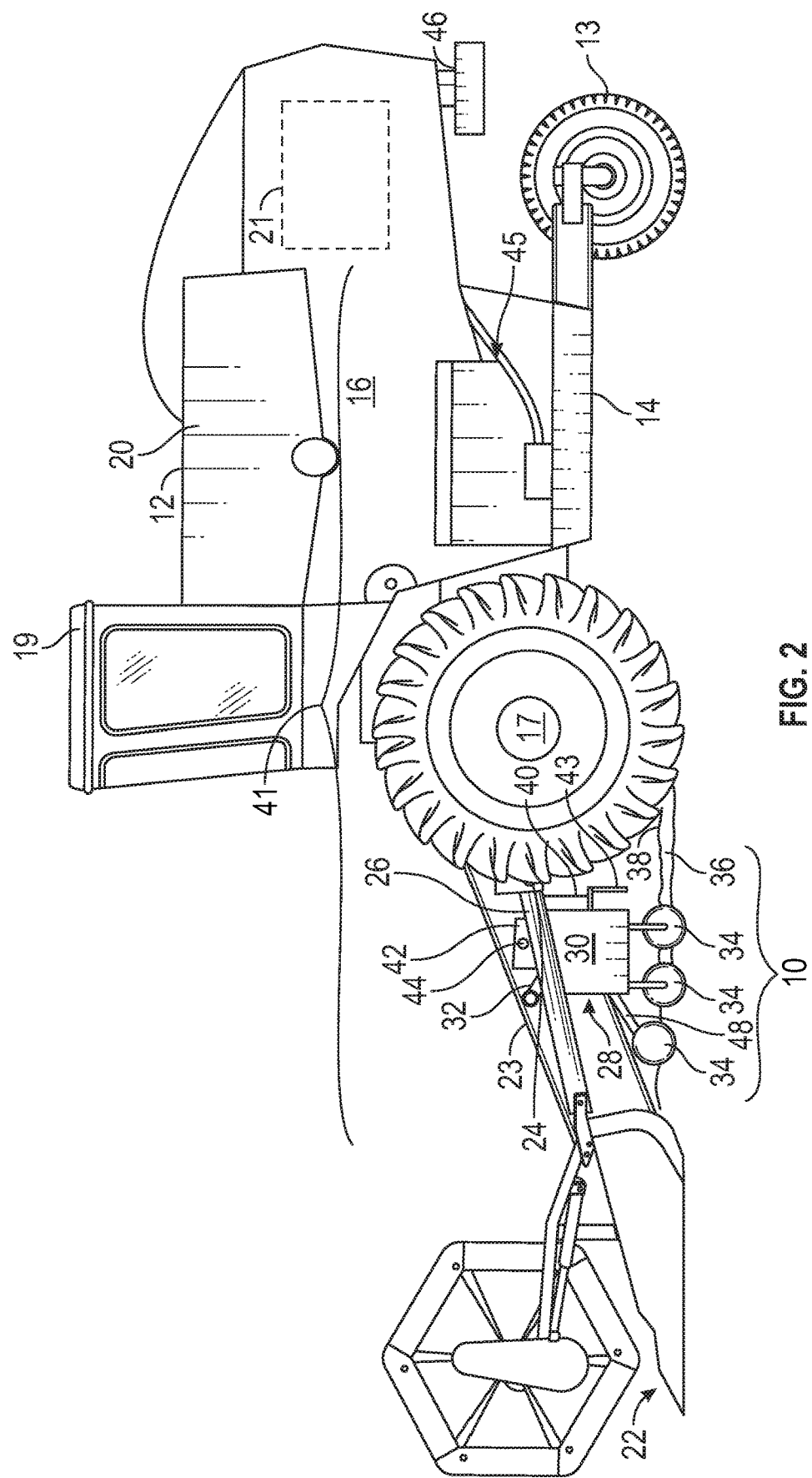
FIG. 2 is a side plan view of a combine with a seed planting system in accordance with embodiments of the present invention.
Figure 5:
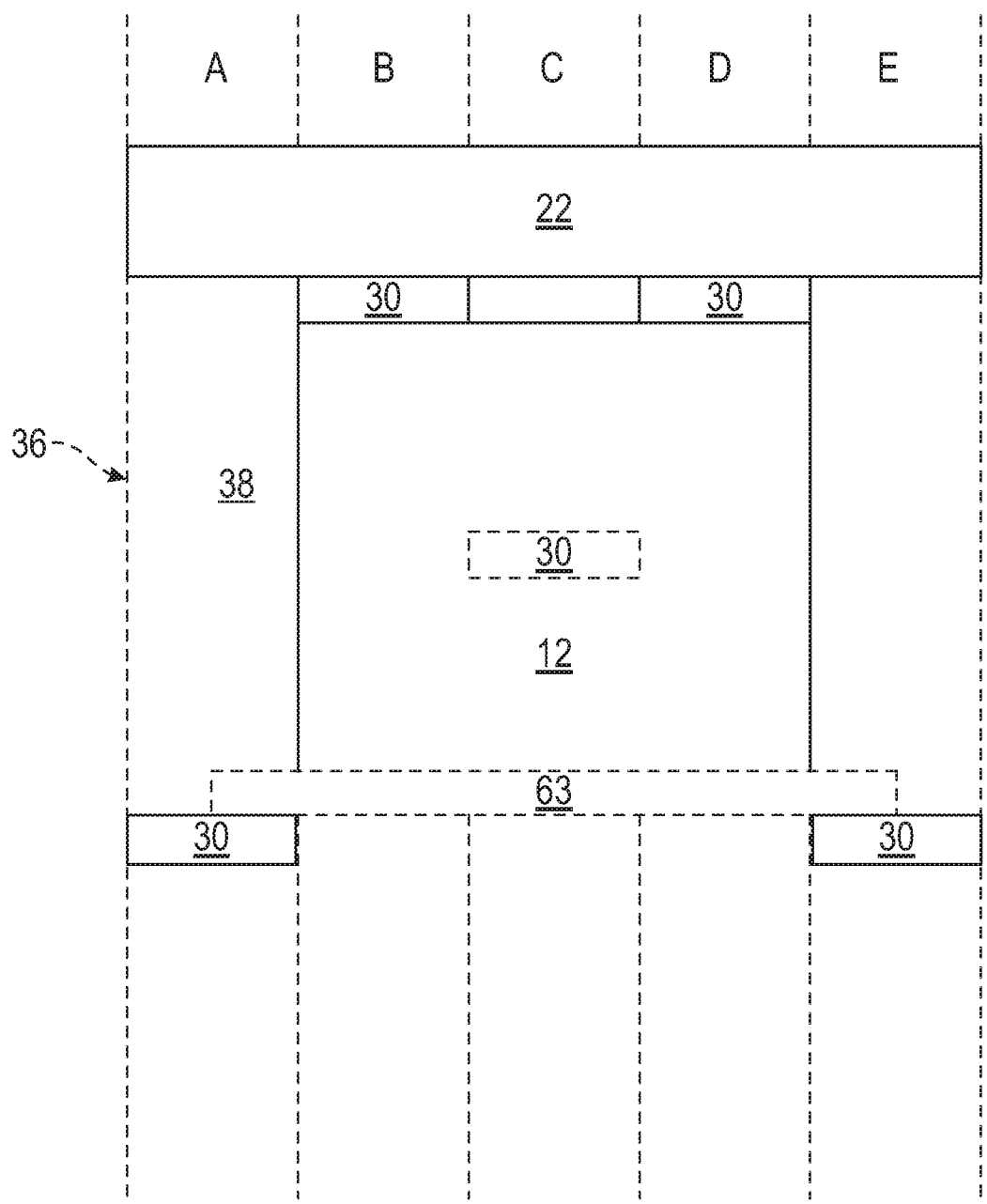
FIG. 5 is an overhead view of a harvester with modular seed planting systems located throughout the harvester in accordance with embodiments of the present invention.

With reference to FIG. 2, a side plan view of an embodiment of the present invention is shown. As shown, planting system 10 can have multiple soil openers 34 along tool frame 30. These multiple soil openers 34 can be staggered one in front of the other, alternating, where one disc would be in a rearward staging with a second in a forward position and a third in a rearward position and repeating as such. Another system of locating tool frames 30 with soil openers 34 is shown in FIG. 5.

As shown in FIG. 2, the seed reservoir 42 is moved closer to soil opening system 28, in fact it can be directly above soil opening system 28/tool frame 30 as shown in FIG. 2. The seed reservoir can be located at any location on the combine or header. In one aspect, the seed reservoir is located between the front and rear axle of the combine. In another aspect, the seed reservoir can be mounted on a telescoping or sliding framework allowing the seed reservoir to be moved for accessing the combine. As in FIG. 1, the delivery assembly 44 is located within or adjacent to the seed reservoir 42 and assists in delivering cover crop seed to the soil 38. In the embodiment where the seed reservoir is located proximate the seed planting system, this can assist in reducing the length of delivery tubes 40, energy consumption, hardware components needed and the chance for operational failures. Tool frame 30 is shown sitting a little further back from header 22 and brackets 32 can be more clearly seen coupled to header 22 or feeder housing 23.

Figure 3A:
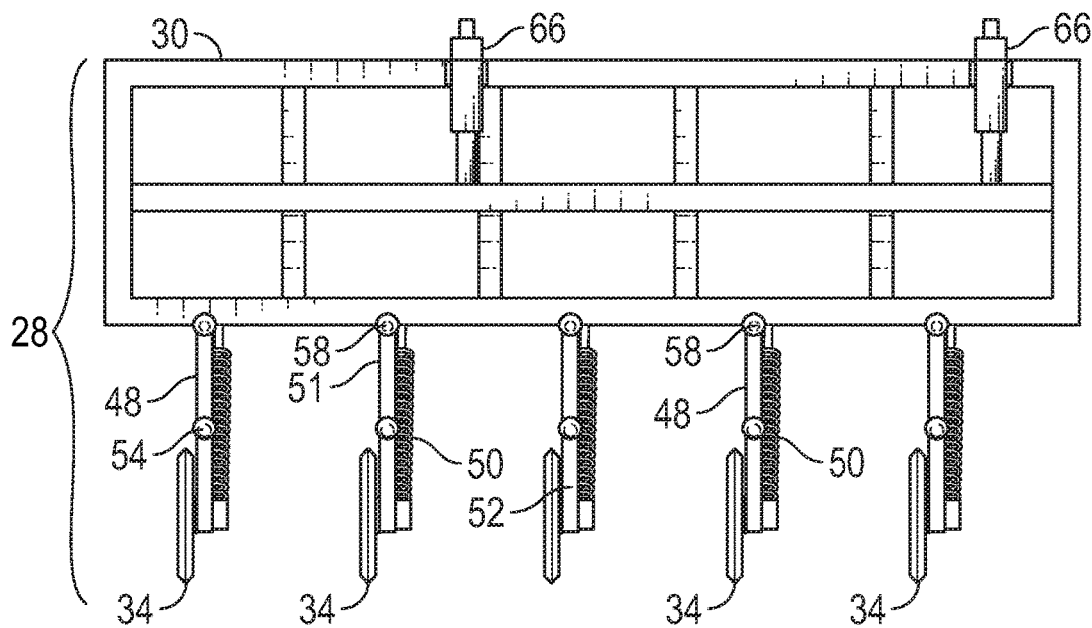
FIGS. 3A-C is a pictorial view of embodiments of a soil opening system in accordance with embodiments of the present invention.
Figure 3B:
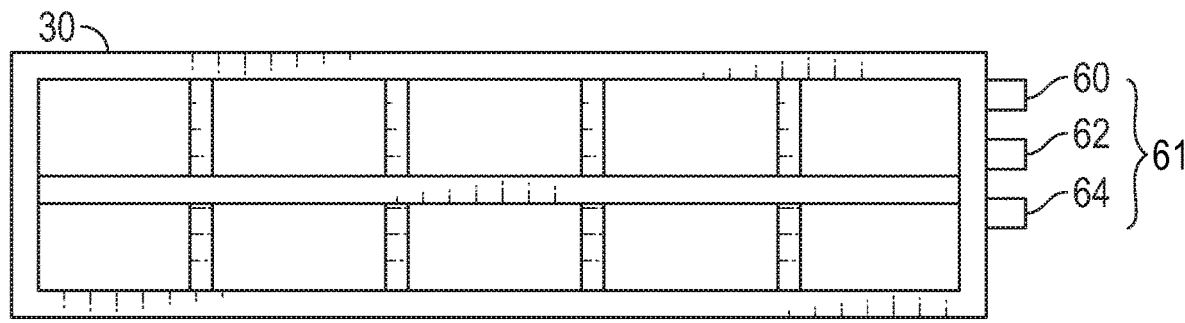
Figure 3C:
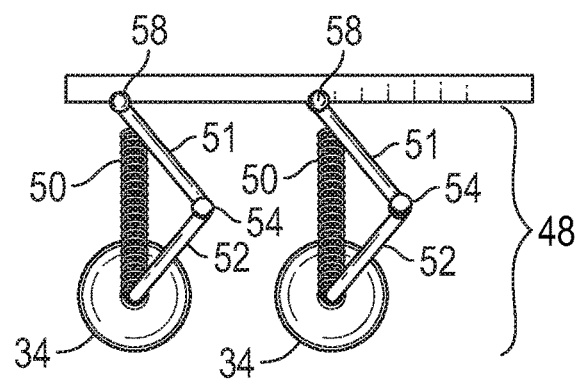

With reference to FIGS. 3A-C, a pictorial view of embodiments of a soil opening system in accordance with embodiments of the present invention is shown. In FIG. 3A, soil opening system 28 is shown with mounting arms 48, tension springs 50, soil opener 34 and actuators 66. Actuators 66 can be most any type of actuator, such as hydraulic, pneumatic, electronic, or power take off (PTO). As discussed in detail above, the soil opening system 28 may be raised and/or lowered with the header 22 by the mounting arms 26 which can be operated by a user in the cab 19. In one aspect, a hydraulic motor (not shown) can be powered by one or more rotating shafts of combine 12 to provide hydraulic actuation of actuators 66.

With reference to FIG. 3B a modular tool frame 30 is shown. Modulation of tool frame 30 makes it, amongst other things, mobile, adjustable, and removably attachable. Tool frame 30 is preferably sized to handle a certain number of rows, such as 5 rows as shown in FIG. 3A or 2 rows as shown in FIG. 3C. This allows the operator to place tool frame 30 most anywhere on combine 12 as detailed in FIG. 5 and discussed in more detail below. Further, actuators 66 allow for tool frame 30 to be raised or lowered closer to the soil 38 in situations where the header 22 is not close enough to soil 38 for the soil openers 34 to reach the soil 38, such as would be the case when harvesting certain crops where the header is kept several or more inches above the soil level. Coupled to tool frame 30 are actuators 66. Actuators 66 can be mounted in most any mechanical fashion, such as a nut and bolt assembly, cotter pin assembly, rivet or most any known fastener. However, it is preferable for the fastener to be a non-permanent type of connector so the actuators 66 can be removed as needed.

Mounting arms 48 have an upper arm 51 and a lower arm 52 coupled together at a flexible joint 54 allowing upper arm 51 and lower arm 52 to move axially about flexible joint 54. A tension spring 50 is coupled to upper arm 51 at an opposite end of flexible joint 54 and to the lower arm 52 at an opposite end of flexible joint 54. Tension spring 50 acts to keep pressure on soil opener 34 so it can be held against soil 38 with enough pressure to create groove 36 but be flexible enough to spring upwards in the event of rough terrain or if soil opener 34 hits a rock in the field. The inventor fully contemplates the soil openers 34 could be held tautly at the end of lower arm 52 in most any fashion, such as a single mounting arm 48 extending outward. Regardless of the configuration, the soil openers 34 should be held against the soil 38 with sufficient force to create grooves 36.

Soil opening system 28 may include pivot assembly 58, which couples mounting arms 48 to tool frame 30. Pivot assembly 58 may allow mounting arms 48 and soil opener 34 to rotate about a vertical axis. When combine 12 should need to make a turn or follow nonlinear paths within the field, the mounting arms 48 are able to flexibly rotate about a vertical axis to prevent the mounting arms 48 from being broken or damaged if they get caught in the soil 38 for whatever reason. In most combines and/or harvesters 12 the steering is in the rear wheels 13 of the combine 12. Because of this, combines 12 can make very sharp turns where the rear of the combine 12 can come around the front at a very sharp angle. Therefore, if the soil openers 34, especially those in the rear of combine 12, are left in the soil 38, this could damage the soil openers 34. Therefore, pivot assembly 58 may allow soil openers 34 to rotate about a vertical axis as the combine 12 is turning to prevent damage to soil openers 34. Pivot assembly 58 could be most any joint such as a ball and socket joint, an ellipsoidal joint, gliding joint, hinge joint, saddle joint, etc. without departing from the spirit of the invention. In one aspect, one or more torsional or like springs are operable within the pivot assembly 58 to help keep each soil opener in a undeflected position, such that upon rotation of the soil opener one or more torsional or like springs return the soil opener to the non-rotated (undeflected) position.

Figure 4:
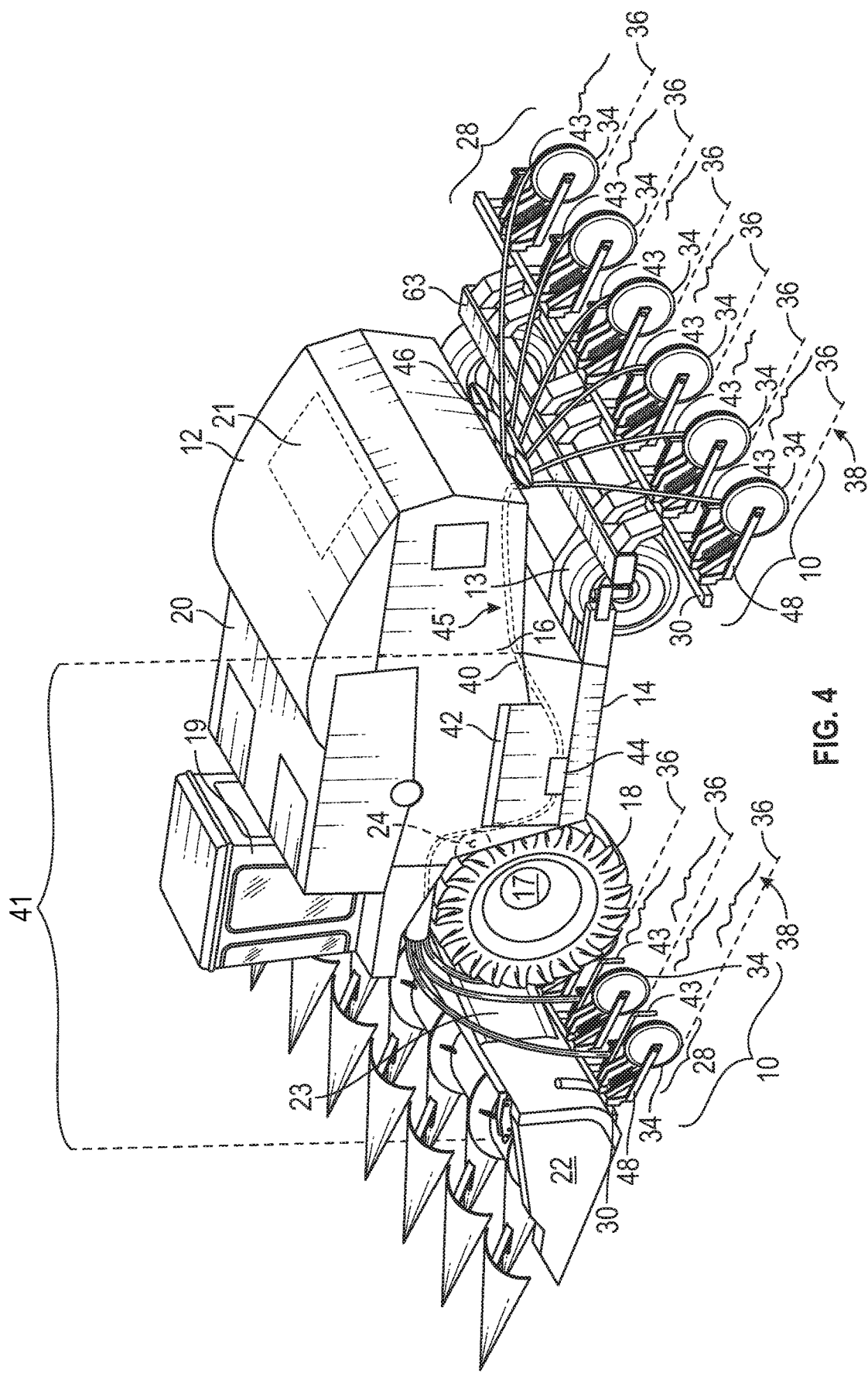
FIG. 4 is a pictorial view of a harvester with a planting mechanism in accordance with embodiments of the present invention.

With reference to FIG. 4 a pictorial view of a harvester with a planting mechanism in accordance with embodiments of the present invention is shown. A planting system 10 for a combine 12 is shown with a soil opening system 28 having several soil openers 34 operably connected to a mounting arm 48. A seed handling system 41 having one or more seed dispensers 43 with a seed tube 40 is operably connected to the seed dispensers 43 and a seed reservoir 42 adapted for housing cover crop seed. A control system 70 (FIG. 6) having one or more actuators 66 is operably connected to one or more connectors 60, 62 and 64, wherein the actuators 66 are operably attached to the soil opening system 28 and seed handling system 41. Further, the soil openers 34 and sets of seed dispensers 43 are operably attached to a header 22 or the combine 12. As best illustrated in FIGS. 3A, 3C, and 4, the soil openers 34 are coupled to the mounting arm 48. Mounting arm 48 is pivotally connected to a tool frame 30, which is operably attached to the header 22. A second set of soil openers 34 can be operably attached to a rear bracket 63 (FIG. 4) of the combine 12. Because of the modularity of tool frame 30, groupings of soil opening systems 28 and seed planting systems 10 can be placed about combine 12 as is shown in further detail in FIG. 5. Pivot assembly 58 is operably attached to the one or more soil openers and the one or more mounting arms 48, wherein the one or more soil openers 34 pivot relative to the one or more mounting arms 48.

Figure 7:
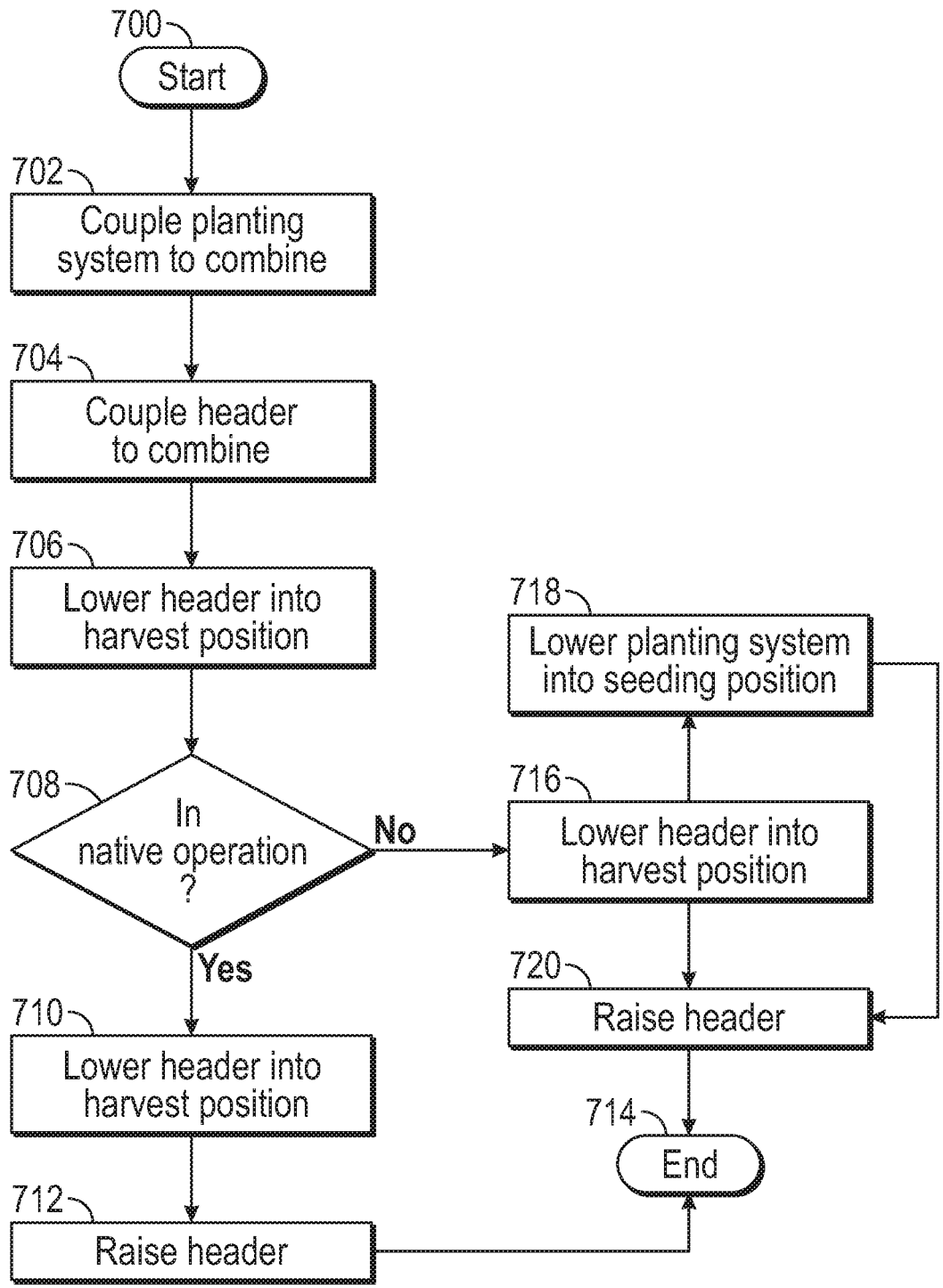
FIG. 7 is a flow diagram detailing the operation of a planting system in accordance with embodiments of the present invention.

In operation, and discussed in more detail in FIG. 7, there is a planting position for the soil openers 34 corresponding to a harvesting position of the header 22 of the combine 12. This would correspond to a downward position for the header 22, or the harvesting position of header 22 which would depend on the type of cash crop being harvested from the field. This position is typically in a position relatively close to the soil 38. However, varying cash crops can be harvested at different heights. For example, when harvesting soybeans, the header must be much closer to the ground than when harvesting corn.

In cab 19, an operator can send a control signal from the one or more controllers on control system 70 (FIG. 6) to the soil opening system 28 and the seed handling system 41 corresponding to a native control operation of the combine 12. This is to say, soil opening system 28 and the seed handling system 41 would be activated by a process which was normal to the harvesting operation of the combine 12. For example, as an operator was beginning a harvesting operation, after driving the combine 12 out to the field to be harvested and connecting the header 22 to combine 12, including connecting all hydraulic, electronic and pneumatic connections, they would begin lowering and powering up the header 22. Since electronic connectors 60, pneumatic connectors 62 and hydraulic connectors 64 are also coupled to electronic port 200, hydraulic port 204 and pneumatic port 202 on the header 22, initiation of power to header 22 would also initiate power to planting system 10.

Like the discussion above, the operator could also initiate a non-planting position of the planting system 10 corresponding to a non-harvesting position of the header 22. In contrast to the discussion above, when the operator has finished harvesting a row of cash crops, he could raise the header 22, which would also power down planting system 10 and more specifically seed handling system 41 to prevent any seed not properly being planted in a groove 36. Connectors 61 (FIG. 3B) such as electronic connectors 60, pneumatic connectors 62 and hydraulic connectors 64 are for operably connecting through docking ports 100 such as electronic port 200, pneumatic port 202 and hydraulic port 204 on the header 22 or combine 12.

With reference again to FIGS. 3A-C, a soil opening module 28 is shown for a combine 22. Soil opening module can have a tool frame 30 with one or more mechanical connectors 61, electronic connectors 60, pneumatic connectors 62 and hydraulic connectors 64 configured for operable attachment to native mechanical connectors 100, electronic 200, pneumatic 204, and hydraulic connectors 202 of header 22 (FIG. 8). One or more soil openers 34 can be operably connected to one or more mounting arms 48 operably attached to the tool frame 30. With reference to FIG. 1, one or more seed dispensers 43 with one or more seed tubes 40 are operably attached to the tool frame 30. One or more actuators 66 can be operably attached to the tool frame 30, wherein the one or more actuators 66 are operably attached to the one or more soil openers 34 and the one or more seed dispensers 43. Further, the tool frame 30 is operably attached to a header 22 of the combine 12 with the one or more mechanical connectors 61 of the tool frame 30 operably attached to one or more mechanical connectors 100 of the header 22. The one or more seed dispensers 43 are operably configured to communicate cover crop seed to the one or more soil openers 34 during a combine operation of the combine 12.

The soil opening module 28 can also be coupled to the seed reservoir 42 adapted for housing cover crop seed. The seed reservoir 42 can be operably attached at the combine 12 and has one or more seed tubes 40 operably integrated with the seed handling system 41. As discussed above, the soil openers 34 have a non-planting position and a planting position actuatable relative to the tool frame 30 by the one or more actuators 66. There are one or more controllers in cab 19 for controlling actuation of the one or more actuators 66 aboard the tool frame 30. The one or more controllers can be operably connectable through docking ports 100 on header 22 or combine 12.

The tool frame 30 and the header 22 of the combine 12 can be operably secured together during transport of the header 22 between fields. It is contemplated further, operation of the planting module 28 corresponds with one or more native controls of the combine 12 as discussed in detail below.

With reference again to FIG. 4, a combine 12 for simultaneously harvesting a cash crop and planting a cover crop is shown. The combine 12 can have a cab 19 housing one or more controls, a motor 21, and a combine frame 14 having a rear wheel 13 supported by a rear axle 15 and front wheel 18 supported front axle 17 driven by the motor 21 and controlled from the cab 19 with the one or more controls within cab 19. A header 22 can be removably attachable to the combine frame 14 and operable from the cab 19. One or more sets of soil openers 34 can be operably attached to the header 22. One or more sets of seed dispensers 43 can be operably configured for planting a cover crop where at least one set of seed dispensers 43 can be operably attached to the header 22. Further, a planting position for the soil openers 34 on the header 22 can correspond with a harvesting position of the header 22.

Another set of soil openers 34 and seed dispensers 43 can be operably attached on an underside of the combine frame 14 between the front 17 and rear axle 15 (FIG. 5). Another set of soil openers 34 and seed dispensers 43 can be operably attached to rear bracket 63 behind the rear axle 15. The seed reservoir 42 can be operably attached to the combine 12 for housing cover crop seed for planting while harvesting. One or more controls in the cab 19 can be operably connected to the one or more sets of seed dispensers 43 for controlling planting. One or more actuators 66 can be operably attached to one of the sets of soil openers 34 for actuating the set of soil openers 34 between a transport position and a planting position. The soil openers 34 can be in contact with soil 38 from which grown crop is harvested with the header 22 in a lowered harvesting position.

FIG. 5 is an overhead view of a harvester with modular seed planting systems located throughout the harvester in accordance with embodiments of the present invention is shown. As shown, tool frame 30 can be placed in most any location on combine 12. As shown in FIG. 5, there are two tool frames 30 having a soil opening system 28 and a seed delivery system 41 coupled to each tool frame 30. There is one modular tool frame located underneath combine coupled to combine frame 14. And, there are two modular tool frames located in the rear of combine 12 located on rear bracket 63.

Tool frame 30 allows the operator to removably attach a planting system 10 almost anywhere on combine 12. If an operator wishes to have his planting system in the rear of combine 12, but does not wish for the discharge from spreader 46 to disrupt the planting process, the operator can set tool frames 30 in rows A and E. Then only rows B, C and D are left to require a tool frame 30. If there is a weight restriction on header 22, then the operator can elect to only couple two tool frames 30 to header 22 for rows B and D. The remaining tool frame 30 can be located underneath or on rear bracket 63 of the combine 12.

The modularity of tool frame 30 allows an operator to move soil opening systems 28 and seed handling systems 41 wherever they will work best on combine 12. Thus if, for example, header 22 has a weight attachment restriction, then the operator can limit the amount of modular tool frames on header 22. The operator can then elect where to place all the tool frames 30 throughout combine 12.

With reference to FIG. 6 a pictorial view of a control panel for a combine in accordance with embodiments of the present invention is shown. A joystick control 600 is shown for the operator to control combine 12. Display 602 is utilized to input and output several different aspects regarding the combine 12, such as GPS, how full grain bin 20 is and speed, fuel, etc. for combine 12. Control panel 604 shows several controllers which can be utilized to operate combine 12 in a native function with planting system 10 or to operate combine 12 separable from planting system 10.

The inventor has designed planting system 10 which is ideally a "plug and play" system; meaning planting system 10 would be attached to combine 12 and operate without separate controls. Thus, when the connectors 61 of planting system 10 are coupled with the docking ports 100 on header 22 or combine 12, then a user could operate both the harvesting operation and the seed planting operation at the same time without changing anything from a typical harvesting operation. For example, as the operator approaches a set of rows A-E to begin harvest, the operator can adjust the header lower control using control panel 604. This would begin lowering header 22 into harvesting position. At the same time, planting system 10 would also be lowered with header 22. When header 22 was in position to begin harvesting, the planting system would be in contact with soil 38. Seed handling system 41 would be powered up including delivery assembly 44. In this same vein, as the operator neared the end of rows A-E, he could reach to control panel 604 and adjust a controller to raise header 22 off the ground.

At the same time planting system 10 would be pulled from the ground and power to delivery assembly 44 would be terminated, thus ending the seeding process as well.

In another method of operation, the operation of the combine 12 and planting system 10 can be totally separate. Controls on control panel 604 can be utilized to operate aspects of planting system 10 once connectors 61 are coupled to docking ports 100. As discussed above, there are some cash crops where header 22 does not need to be close to soil 38 and in fact it is preferred if the header 22 is not close to the soil 38. If the operator has an application like this then as in the above scenario, as the operator arrived at rows A-E to begin harvesting, he would toggle a control on control panel 604 to lower the header to the desired position. At a raised height, planting system 10 will not be in contact with soil 38. Thus, the operator would toggle a separate switch on control panel 604 to activate actuators 66 which will lower soil opening system 28 until it is in contact with the soil 38. If the system is modular, then each tool frame 30 is lowered until all soil openers are on the ground. A pressure sensor (not shown) located on the tool frame 30 could inform the user when the soil openers 34 are on the soil 38. Ideally each tool frame 30 is connected to the same switch on control panel 604; however, it is contemplated each tool frame 30 could have its own switch and be raised and lowered independently.

As the user came to the end of rows A-E, both the header 22 and each tool frame 30 could be raised and power cut off to delivery assembly 44.

With reference to FIG. 7, a flow diagram detailing the operation of a planting system in accordance with embodiments of the present invention is shown. At state 700, combine 12 could be powered on to begin a harvesting operation. Commonly in a harvesting operation the combine and the header 22 are taken separately to the field to be harvested. Thus, at state 702, planting system 10 could be coupled to header 22 before transport, or if tool frames 30 are being used, the modular tool frames could be coupled on the header 22 and other locations of combine 12, such as combine frame 14 and/or rear bracket 63.

At state 704, header 22 could be coupled to combine 12 in preparation for harvest. When the operator is ready to begin harvest and combine 12 is at rows A-E ready to begin, the operator can initiate at the control panel 604 for header 22 to be lowered into harvesting position at state 706. At state 708, it must be determined whether planting system 10 is to operate in a native fashion (e.g., all functions of planting system 10 will be controlled through the native operation of combine 12) or will the combine operations be separate from the planting system.

At state 710, the native controls will operate both the functions of the combine and the planting system 10. Thus, the combine's electronic, pneumatic and hydraulic connectors 61 coupled with the docking ports 100 on the header 22 or on the combine 12 and all operations can be controlled from control panel 604 utilizing the harvesting native functions. Thus, as the header 22 was lowered and powered on, planting system 10 would also be lowered with header 22, and seed handling system 41 would be powered on as well to bring seeds from seed reservoir 42 to seed dispenser 43 via delivery assembly 44. At state 712, header 22 could be raised out of harvesting position when reaching the end of a cash crop row or upon completion of harvesting. The operator can, through control panel 604, turn off power to the header 22 and planting system 10 and if the user is finished harvesting then move to state 714 to end the process.

At state 716, the operator is using planting system 10 in a non-native methodology. Meaning, the user will control the header 22 and planting system 10 separately. The operator can begin by lowering header 22 into harvesting position and powering up the reciprocating knife cutter bar, etc. to being harvesting operations. If necessary, at state 718, the user would, from control panel 604, lower planting system 10 into place until each of the soil openers 34 of the soil opening system 28 is in place. This would include any tool frames 30 as well if the combine 12 is utilizing a modular planting system, such as shown in FIG. 5. The operator would then also control a switch on control panel 604 to power up the seed handling system 41 so cover seed can be transferred from seed reservoir 42 to seed dispensers 43. At state 720, when the operator arrives at the end of a harvested row or they are finished harvesting, the header 22 can be raised to stop harvesting. If the user is not finished harvesting and planting, when the header is raised, all the operator would need to do is power down the seed handling system 41 to stop seed from being sent to the dispensers 43. Because the header is elevated the soil openers have also been raised off the soil 38.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer two elements are directly connected and in fixed relation to each other. It is intended all matter contained in the above description or shown in the accompanying drawings shall be interpreted as illustrative only and not limiting. Changes in detail or structure may be made without departing from the spirit of the invention as defined in the appended claims. Although the present invention has been described with reference to the embodiments outlined above, various alternatives, modifications, variations, improvements and/or substantial equivalents, whether known or are or may be presently foreseen, may become apparent to those having at least ordinary skill in the art. Persons skilled in the art will recognize changes may be made in form and detail without departing from the spirit and scope of the invention. Therefore, the invention is intended to embrace all known or earlier developed alternatives, modifications, variations, improvements, and/or substantial equivalents.

What is claimed is:

1. A planting system for a combine, comprising:
   a combine frame operably supported by one or more axles and having an operator's cab with one or more combine controls and one or more soil opener controls, wherein at least one of the one or more axles is driven by a motor;
   a header operably attached to the combine frame for harvesting a crop;
   one or more header actuators for actuating the header to a harvesting position wherein the header is positioned proximate the soil and a non-harvesting position wherein the header is positioned away from the soil using the one or more combine controls;
   a soil opening system having one or more soil openers operably attached the combine frame;
   one or more soil opener actuators for actuating the one or more soil openers to a planting position wherein the soil openers are positioned in the soil and a non-planting position wherein the soil openers are positioned away from the soil using the one or more soil opener controls;
   a seed handling system having one or more seed dispensers with one or more seed tubes operably connected to the one or more seed dispensers and a seed reservoir adapted for housing cover crop seed, wherein each of the one or more soil openers include at least one of the one or more seed dispensers for planting cover crop seed; and
   a controller operably connected to the one or more soil opener controls and the one or more soil opener actuators, and operably connected to the one or more combine controls and the one or more header actuators;
   a control panel within the operator's cab, the control panel having the one or more combine controls comprising a header actuator control for operating the header between the harvesting position and the non-harvesting position, and one or more soil opener controls comprising a soil opener actuator control for operating the one or more soil openers between the planting position and the non-planting position dependent on the one or more combine controls;
   wherein the soil opener actuator control is dependent on the header actuator control.

2. The planting system of claim 1, wherein the soil opener actuator control is dependent on one or more native combine controls comprising a control signal originating from an operator of the controller.

3. The planting system of claim 1, further comprising one or more native combine controls comprising at least a thresher operation, wherein the soil opener actuator control is based on native operations of the combine.

4. The planting system of claim 1, wherein the controller is operably connected to one or more seed handling system controls and the one or more seed dispensers for planting cover crop seed dependent on the header actuator control.

5. The planting system of claim 1, further comprising:
   two or more sets of the one or more soil openers, wherein a first set of the two or more sets of the one or more soil openers is operably controlled by soil actuator control and a second set of the two or more sets of the one or more soil openers is operably controlled by the soil opener actuator control dependent on one or more native combine controls, wherein the one or more native combine controls comprise a process which is normal to harvesting operations of the combine.

6. A planting system for a combine, comprising:
   a combine frame operably supported by one or more axles and having an operator's cab with one or more combine controls and one or more seed planting controls, wherein at least one of the one or more axles is driven by a motor;
   a header operably attached to the combine frame for harvesting a crop;
   one or more header actuators for actuating the header to a harvesting position wherein the header is positioned proximate the soil and a non-harvesting position wherein the header is positioned away from the soil using the one or more combine controls;
   a soil opening system having one or more soil openers operably attached the combine frame;
   one or more soil opener actuators for actuating the one or more soil openers to a planting position wherein the soil openers are positioned in the soil and a non-planting position wherein the soil openers are positioned away from the soil using the one or more seed planting controls;

a seed handling system having one or more seed dispensers with one or more seed tubes operably connected to the one or more seed dispensers and a seed reservoir adapted for housing cover crop seed, wherein each of the one or more soil openers include at least one of the one or more seed dispensers for planting cover crop seed; and a controller operably connected to the one or more seed planting controls and the one or more soil opener actuators, and operably connected to the one or more combine controls and the one or more header actuators;

a control panel within the operator's cab, the control panel having the one or more combine controls comprising a header actuator control for operating the header between the harvesting position and the non-harvesting position, a seed handling system actuator control for operating the one or more seed dispensers for planting cover crop seed, a thresher actuator control for operating a thresher for harvesting the crop, and the one or more seed planting controls comprising a soil opener actuator control for operating the one or more soil openers between the planting position and the non-planting position;

wherein the soil opener actuator control is dependent on at least the header actuator control.

7. The planting system of claim 6, wherein a soil opener control actuating the one or more soil opener actuators for moving the one or more soil openers to the planting position is further dependent on one or more native combine controls comprising a process which is normal to harvesting operations of the combine.

8. The planting system of claim 6, wherein a control signal from the controller to the soil opener actuator control and the seed handling system actuator control is based on a native control operation of the combine.

9. The planting system of claim 6, wherein one or more native combine controls comprise at least the header actuator control, the thresher actuator control, and a direction of travel of the combine.

10. The planting system of claim 6, wherein the one or more seed planting controls comprise at least the soil opener actuator control and seed handling system actuator control.

11. A planting system for a combine, comprising:

a combine frame operably supported by one or more axles and having an operator's cab with one or more combine controls and one or more soil opener controls, wherein at least one of the one or more axles is driven by a motor;

a header operably attached to the combine frame for harvesting a crop;

one or more header actuators for actuating the header to a harvesting position wherein the header is positioned proximate the soil and a non-harvesting position wherein the header is positioned away from the soil using the one or more combine controls;

a soil opening system having one or more soil openers operably attached the combine frame;

one or more soil opener actuators for actuating the one or more soil openers to a planting position wherein the soil openers are positioned in the soil and a non-planting position wherein the soil openers are positioned away from the soil using the one or more soil opener controls;

a seed handling system having one or more seed handling system controls, one or more seed dispensers with one or more seed tubes operably connected to the one or more seed dispensers, and a seed reservoir adapted for housing cover crop seed, wherein each of the one or more soil openers include at least one of the one or more seed dispensers for planting cover crop seed; and a controller operably connected to the one or more soil opener controls, the one or more soil opener actuators, the one or more combine controls, the one or more header actuators, the one or more seed handling system controls, and the one or more seed dispensers for planting cover crop seed dependent on a header actuator control;

a control panel within the operator's cab, the control panel having the one or more combine controls comprising the header actuator control for operating the header between the harvesting position and the non-harvesting position, and one or more soil opener controls comprising a soil opener actuator control for operating the one or more soil openers between the planting position and the non-planting position dependent on the one or more combine controls.

* * * * *